(12) United States Patent
Lauer

(10) Patent No.: US 10,590,788 B2
(45) Date of Patent: Mar. 17, 2020

(54) DEVICE AND METHOD FOR INFLUENCING THE TEMPERATURES IN INNER RING SEGMENTS OF A GAS TURBINE

(71) Applicant: MTU Aero Engines AG, Munich (DE)

(72) Inventor: Christoph Lauer, Munich (DE)

(73) Assignee: MTU Aero Engines AG, Munich (DE)

( * ) Notice: Subject to any disclaimer, the term of this patent is extended or adjusted under 35 U.S.C. 154(b) by 1029 days.

(21) Appl. No.: 15/229,885

(22) Filed: Aug. 5, 2016

(65) Prior Publication Data

US 2017/0138209 A1 May 18, 2017

(30) Foreign Application Priority Data

Aug. 7, 2015 (DE) .................. 10 2015 215 144

(51) Int. Cl.
*F01D 11/00* (2006.01)
*F01D 25/14* (2006.01)
(Continued)

(52) U.S. Cl.
CPC ............ *F01D 11/003* (2013.01); *B64D 27/10* (2013.01); *F01D 25/12* (2013.01); *F01D 25/14* (2013.01); *F01D 25/26* (2013.01); *F05D 2240/11* (2013.01); *F05D 2240/55* (2013.01); *F05D 2260/20* (2013.01); *Y02T 50/671* (2013.01); *Y02T 50/675* (2013.01)

(58) Field of Classification Search
CPC ...... F01D 11/003; F01D 11/005; F01D 11/08; F01D 25/08; F01D 25/12; F01D 25/14; F01D 25/145; F01D 25/26; F05D 2260/20; F05D 2240/55; F05D 2240/11; B64D 27/10; Y02T 50/671; Y02T 50/675
See application file for complete search history.

(56) References Cited

U.S. PATENT DOCUMENTS

| 2,584,899 | A | * | 2/1952 | McLeod | ............... F01D 9/041 |
| | | | | | 384/313 |
| 3,300,178 | A | * | 1/1967 | Waheeb | ............... F01D 9/042 |
| | | | | | 415/115 |

(Continued)

FOREIGN PATENT DOCUMENTS

| CN | 101860119 | 10/2010 |
| DE | 60213538 | 8/2007 |

(Continued)

*Primary Examiner* — David E Sosnowski
*Assistant Examiner* — Wayne A Lambert
(74) *Attorney, Agent, or Firm* — Davidson, Davidson & Kappel, LLC

(57) ABSTRACT

A device for influencing the temperatures in inner ring segments of a gas turbine is provided, which includes in the circumferential direction of the gas turbine, at least one outer shell assembly having a plurality of outer ring segments and at least one inner shell assembly having a plurality of inner ring segments. The inner ring segments are equal to or greater in number than the outer ring segments. An outer ring segment gap is between each two adjacent outer ring segments. An inner ring segment gap is between each two adjacent inner ring segments. An outer ring segment gap, or at least a radial cooling air passage, is located opposite each inner ring segment gap in the radial direction of the gas turbine.

22 Claims, 1 Drawing Sheet

(51) Int. Cl.
*F01D 25/26* (2006.01)
*B64D 27/10* (2006.01)
*F01D 25/12* (2006.01)

(56) References Cited

U.S. PATENT DOCUMENTS

| | | | | |
|---|---|---|---|---|
| 3,408,044 A * | 10/1968 | Burger | F01D 25/12 | 415/117 |
| 3,603,599 A * | 9/1971 | Laird | F01D 11/127 | 277/414 |
| 3,869,222 A * | 3/1975 | Rahnke | F01D 11/005 | 415/134 |
| 3,907,458 A * | 9/1975 | Liddle | F01D 11/08 | 415/115 |
| 3,986,789 A * | 10/1976 | Pask | F01D 5/187 | 415/178 |
| 4,017,207 A * | 4/1977 | Bell | F01D 11/08 | 415/115 |
| 4,023,919 A * | 5/1977 | Patterson | F01D 11/18 | 415/134 |
| 4,101,242 A * | 7/1978 | Coplin | F01D 11/18 | 415/134 |
| 4,271,666 A * | 6/1981 | Hurley | F02K 1/825 | 415/116 |
| 4,303,371 A * | 12/1981 | Eckert | F01D 11/08 | 415/116 |
| 4,337,016 A * | 6/1982 | Chaplin | F01D 11/24 | 415/116 |
| 4,379,677 A * | 4/1983 | Hallinger | F01D 11/24 | 415/116 |
| 4,431,373 A * | 2/1984 | Monsarrat | F01D 25/246 | 415/1 |
| 4,571,153 A * | 2/1986 | Keller | F01D 3/02 | 415/103 |
| 4,668,163 A | 5/1987 | Kervistin | | |
| 4,721,433 A * | 1/1988 | Piendel | F01D 25/14 | 415/115 |
| 4,841,726 A * | 6/1989 | Burkhardt | F01D 11/24 | 415/116 |
| 4,897,021 A * | 1/1990 | Chaplin | F01D 5/22 | 267/160 |
| 5,027,604 A | 7/1991 | Krueger | | |
| 5,100,291 A * | 3/1992 | Glover | F01D 11/24 | 165/169 |
| 5,176,495 A * | 1/1993 | Honkomp | F01D 25/145 | 415/173.1 |
| 5,195,868 A * | 3/1993 | Plemmons | F01D 25/145 | 29/525.02 |
| 5,205,115 A * | 4/1993 | Plemmons | F01D 11/24 | 415/115 |
| 5,219,268 A * | 6/1993 | Johnson | F01D 11/24 | 415/115 |
| 5,423,123 A * | 6/1995 | McQuilkin | B21D 53/045 | 29/421.1 |
| 5,470,198 A | 11/1995 | Harrogate et al. | | |
| 5,480,281 A * | 1/1996 | Correia | F01D 11/08 | 415/115 |
| 5,980,201 A * | 11/1999 | Benoist | F01D 25/14 | 415/115 |
| 6,382,906 B1 | 5/2002 | Brassfield et al. | | |
| 6,492,034 B1 * | 12/2002 | Nazmy | F01D 25/08 | 376/287 |
| 6,554,563 B2 * | 4/2003 | Noe | F01D 5/189 | 415/115 |
| 6,554,566 B1 | 4/2003 | Nigmatulin | | |
| 6,962,482 B2 * | 11/2005 | Tanaka | F01D 5/225 | 277/414 |
| 7,207,771 B2 * | 4/2007 | Synnott | F01D 11/08 | 415/173.1 |
| 7,360,987 B2 | 4/2008 | Arraitz et al. | | |
| 7,604,453 B2 | 10/2009 | Lee | | |
| 7,798,765 B2 * | 9/2010 | Snyder | F01D 25/26 | 415/1 |
| 8,092,175 B2 | 1/2012 | Beeck et al. | | |
| 8,166,764 B2 * | 5/2012 | Chokshi | F01D 5/186 | 60/758 |
| 9,500,095 B2 * | 11/2016 | Pietrobon | F01D 25/246 | 415/1 |
| 2003/0082046 A1 | 5/2003 | Nigmatulin | | |
| 2004/0146399 A1 * | 7/2004 | Bolms | F01D 25/12 | 415/175 |
| 2004/0228723 A1 * | 11/2004 | Dittmann | F01D 25/12 | 415/117 |
| 2005/0123389 A1 | 6/2005 | Morris et al. | | |
| 2005/0150632 A1 * | 7/2005 | Mayer | F01D 25/08 | 165/47 |
| 2007/0065274 A1 * | 3/2007 | Birrell | F01D 25/14 | 415/116 |
| 2008/0206046 A1 * | 8/2008 | Razzell | F01D 11/005 | 415/173.1 |
| 2008/0310949 A1 * | 12/2008 | Kondo | F01D 21/00 | 415/47 |
| 2010/0260598 A1 * | 10/2010 | Kirby | F01D 11/24 | 415/177 |
| 2010/0303610 A1 * | 12/2010 | Wang | F01D 5/18 | 415/115 |
| 2013/0017060 A1 * | 1/2013 | Boswell | F01D 11/24 | 415/1 |
| 2013/0213057 A1 | 8/2013 | Lutjen et al. | | |
| 2014/0013762 A1 * | 1/2014 | Takiguchi | F23R 3/42 | 60/737 |
| 2015/0226085 A1 * | 8/2015 | Spangler | F01D 25/12 | 60/806 |
| 2018/0187565 A1 * | 7/2018 | Abate | F01D 9/065 | |

FOREIGN PATENT DOCUMENTS

| | | |
|---|---|---|
| DE | 60213538 T2 | 8/2007 |
| EP | 0244693 | 11/1987 |
| EP | 0959230 B1 | 11/1999 |
| EP | 1052375 | 11/2000 |
| EP | 1847684 | 10/2007 |
| WO | WO2011157549 | 12/2011 |

* cited by examiner

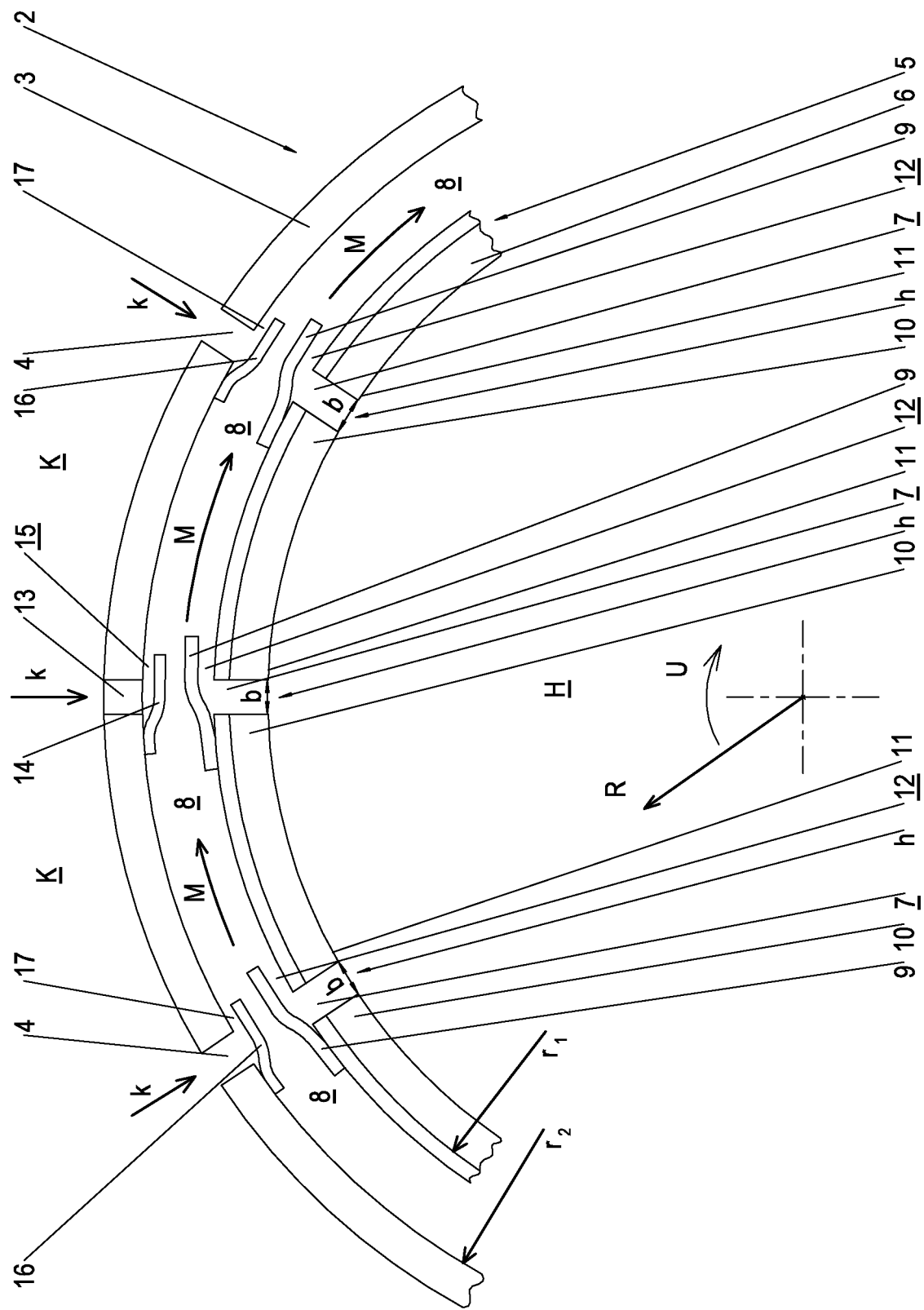

DEVICE AND METHOD FOR INFLUENCING THE TEMPERATURES IN INNER RING SEGMENTS OF A GAS TURBINE

This claims the benefit of German Patent Application DE102015215144.1, filed Aug. 7, 2015 and hereby incorporated by reference herein.

The present invention relates to a device for influencing the temperatures in inner ring segments of a gas turbine, and to a method for influencing the temperatures in inner ring segments of a gas turbine using the device.

BACKGROUND

In gas turbines, a hot gas flow is passed between two stator vane rings within a shroud ring. The shroud ring includes an outer shell and an inner shell, each of which are segmented. The number of outer segments is usually greater than the number of inner segments. Generally, gaps between the outer segments are located opposite central regions of inner segments. The gaps allow for thermal expansion of the outer segment and the inner segments. During operation, a portion of the hot gas flows into the gaps between the inner segments and heats up the end portions of the inner segments. The central regions are slightly cooler. Furthermore, cooling air flows through the gaps of the outer segments and impinges on the central regions of the already cooler inner segments. This results in high temperature gradients within the inner segments, causing cracks.

In order to overcome this problem, cover elements are placed over the gaps between the inner segments, the cover elements each being attached to an inner segment and extending over an adjacent inner segment. However, there is still leakage of hot gas, whereby the circumferential end portions of the inner segments are heated to a greater degree than the central regions. Alternatively, the inner segments are reinforced, which, however, increases the weight of the inner segments.

German publication DE 602 13 538 T2 describes a gas turbine having inner shroud segments and outer shroud segments. Cooling air flows through gaps between the inner shroud segments from the outside to the inside in the radial direction of the gas turbine to prevent hot gas from entering the gaps and heating the circumferential end portions of the inner shroud segments. The disadvantage here is the complex geometry of the end portions of the inner shroud segments, which requires increased manufacturing effort.

U.S. Pat. No. 7,604,453 B2 discloses a gas turbine having outer and inner cover segments forming a shroud assembly between a first row of stator vanes and a high pressure turbine section. Cooling air flows from the outside to the inside in the radial direction of the gas turbine through a gap located between the outer platforms of the row of stator vanes and the inner ring. Moreover, the inner cover segments are cooled by impingement cooling, convection cooling and film cooling. It is a disadvantage here that the inner and outer cover segments have a very high degree of structural complexity, which requires increased manufacturing effort.

European publication EP 0 959 230 B1 describes a gas turbine where inner ring segments downstream of a ring of high pressure guide vanes are cooled by impingement cooling, convection cooling and film cooling. Here too, the structural geometry is complex and requires considerable assembly effort.

U.S. Pat. No. 5,470,198 relates to a gas turbine which has a seal assembly located between combustion chamber discharge nozzles and an first ring of guide vanes and which uses cooling air flows. The seal assembly is specifically designed for this application.

SUMMARY OF THE INVENTION

It is an object of the present invention to provide a device which improves the temperature distribution in inner ring segments of a gas turbine, yet is simple in design, requires little manufacturing effort, and has a relatively low weight.

This object is achieved in accordance with the present invention by a device for influencing the temperatures in inner ring segments of a gas turbine. This object is also achieved by a method for influencing the temperatures in inner ring segments of a gas turbine. Advantageous embodiments of the present invention are set forth in the dependent claims.

In accordance with the present invention, this object is achieved by a device for influencing the temperatures in inner ring segments of a gas turbine, the device including, in the circumferential direction of the gas turbine, at least one outer shell assembly having a plurality of outer ring segments and at least one inner shell assembly having a plurality of inner ring segments, the plurality of inner ring segments being equal to or greater in number than the plurality of outer ring segments, an outer ring segment gap being present between each two adjacent outer ring segments, and an inner ring segment gap being present between each two adjacent inner ring segments. An outer ring segment gap, or at least a radial cooling air passage, is located opposite each inner ring segment gap in the radial direction of the gas turbine.

The approach of the present invention has the advantage that at each circumferential position where hot gas can enter the area between the outer shell assembly and the inner shell assembly through an inner ring segment gap, there is also an outer ring segment gap, or at least a cooling air passage, disposed radially opposite, so that the hot gas mixes immediately with the cooling air and no significant temperature gradients develop within the inner shell assembly or the outer shell assembly. This minimizes thermal stresses in the material, allowing the inner and outer shell assemblies to be designed relatively thin, and thus to have a low weight, without the risk of these shell assemblies experiencing structural failure due to thermal stresses. In contrast, in the known prior art devices, where an inner ring segment gap is not always located radially opposite an outer ring segment gap or a cooling air passage, or vice versa, such thermal stresses can occur in the circumferential direction of the inner shell assembly and/or the outer shell assembly.

Preferably, each inner ring segment gap has a first ship lap associated therewith, each outer ring segment gap has a second ship lap associated therewith, and each cooling air passage has a pseudo ship lap associated therewith to deflect subflows into the same circumferential direction. This has the advantage that, while a portion of a hot gas and cooling air flow into a mixing space located between the outer ring segments and the inner ring segments, the first ship laps deflect the portion of hot gas and the second ship laps and the pseudo ship laps deflect the cooling air into the same direction such that the cooling air and the portion of hot gas can mix well with one another.

The cooling air and the portion of hot gas flow into the mixing space whereby, during the mixing process, a mixed temperature is obtained which is transferred to both the outer ring segments and the inner ring segments, thereby evening out the temperatures in the outer ring segments and in the inner ring segments. This prevents the formation of central regions that are cooler than the peripheral regions adjacent the central region, especially in the inner ring segments, thus reducing thermal gradients that develop in the inner ring segments in this manner. Such thermal gradients could otherwise lead to cracks in the inner ring segments or even to failure or breakage of inner ring segments.

In an advantageous embodiment of the present invention, the first ship laps, the second ship laps and the pseudo ship laps overlap their respectively associated inner ring segment gaps, outer ring segment gaps and cooling air passages in the circumferential direction of the gas turbine. This reduces direct clashing of the portion of hot gas with the cooling air within the mixing space, thus also reducing deceleration and flow losses.

Further, the first ship laps, the second ship laps and the pseudo ship laps may be continuous metal plates without any discontinuities in the material, and may thus provide baffle plates. Accordingly, the ship laps are made of solid material, so that the cooling air and the portion of hot gas can flow into the mixing space without any additional losses due to leakage.

The first ship laps may end at the same positions as the second ship laps or the pseudo ship laps or overlap them in the circumferential direction of the gas turbine. If the first ship laps, the second ship laps and the pseudo ship laps end at the same positions, then the cooling air and the portion of hot gas flow together simultaneously, whereby particularly good mixing is achieved. If the first ship laps overlap the second ship laps and the pseudo ship laps, then the cooling air flows over the ends of the second ship laps and pseudo ship laps toward these heavily thermally loaded locations and cools the same.

In another embodiment of the present invention, the ratio of the number of inner ring segments to the number of outer ring segments is 2:1. Thus, outer ring segment gaps and cooling air passages are disposed alternately opposite the inner ring segment gaps. Accordingly, only one cooling air passage or one row of cooling air passages is needed per outer ring segment. Therefore, only little manufacturing effort is required.

The present invention also relates to a stationary gas turbine including the device. Alternatively, the present invention relates to an aircraft engine including the device.

The object of the present invention is further achieved by a method for influencing the temperatures in inner ring segments of a gas turbine using the device, whereby at least two first subflows of hot gas and at least two second subflows of cooling air flow into the mixing space, the first subflows of hot gas and the second subflows of cooling air are thermally mixed in the mixing space, thereby producing a mixed flow, the first subflows of hot gas and the second subflows of cooling air flowing into the mixing space in the same circumferential direction of the gas turbine.

It is advantageous to divide the cooling air and the portion of hot gas into subflows during flow into the mixing space, because mixing individual subflows is thermally more efficient than mixing an undivided flow of cooling air with a not further divided portion of the hot gas. Particularly efficient and low-loss mixing can be achieved when the first subflows of hot gas and the second subflows of cooling air flow in the same direction. During mixing of the first subflows of hot gas and the second subflows of cooling air, the temperatures in the inner ring segments are evened out. Evening out the temperatures in the inner ring segments prevents the formation of cracks in the inner ring segments, thereby preventing potential failure of the inner ring segments. Thus, the first subflows of hot gas are used in a purposeful manner to equalize temperatures. In conventional arrangements, such subflows of hot gas would have been considered merely as leakage.

In a practical embodiment of the present invention, the second subflows of cooling air enter the mixing space upstream of or at the same position as the first subflows of hot gas in the circumferential direction of the gas turbine. If the second subflows of cooling air enter the mixing space upstream of the first subflows of hot gas, then the ends of the first ship laps are cooled, thereby preventing peak thermal loads in the first ship laps. If the second subflows of cooling air enter the mixing space at the same position as the first subflows of hot gas, then uniform mixing occurs, which is favorable for the temperature transfer to the inner ring segments. In another embodiment of the present invention, the mixed flow passes through the mixing space in the circumferential direction of the gas turbine. Passage of flow in the circumferential direction has the advantage that the first subflows of hot gas and the second subflows of cooling air flow along the inner ring segments, a temperature of a mixed flow of the first subflows of hot gas and the second subflows of cooling air being convectively transferred to the inner ring segments, and the thermal gradients within the inner ring segments being minimized. In a practical embodiment of the present invention, the mixed flow exits through gaps in axially downstream holders of the inner ring segments. In this way, the mixed flow of the first subflows of hot gas and the second subflows of cooling air can be led out of the mixing space in a simple manner.

BRIEF DESCRIPTION OF THE DRAWING

An exemplary embodiment of the present invention is described in greater detail below with reference to the single FIGURE, FIG. 1, which is a schematic cross-sectional view of a device according to the present invention.

DETAILED DESCRIPTION

FIG. 1 schematically shows in cross section a device 1 having an outer shell assembly 2 and an inner shell assembly 5 of a not further shown thermal turbomachine which will be described below as a gas turbine in accordance with the exemplary embodiment. An outer shell assembly 2 and an associated inner shell assembly 5 are disposed between each two adjacent stator vane rings. Outer shell assembly 2 includes at least two outer ring segments 3. In FIG. 1, one outer ring segment 3 is illustrated in detail and two other outer ring segments 3 are depicted fragmentarily. Inner shell assembly 5 includes a plurality of inner shell segments 6, of which four inner shell segments 6 are shown in FIG. 1. The number of inner ring segments 6 is greater than the number of outer ring segments 3. In the FIGURE, the ratio of the number of inner ring segments 6 to the number of outer ring segments 3 is two to one.

Inner ring segments 6 are curved in circumferential direction U of the gas turbine and form an annular inner shell, not entirely shown in FIG. 1. An inner ring segment gap 7 is located between each two adjacent inner ring segments 6. Width b of inner ring segment gaps 7 is selected to be as small as possible, so that only a minimal portion of hot gas H is diverted from a turbine chamber (not shown) of the gas turbine.

Disposed at inner ring segment gaps 7 are first ship laps 9, each of which are externally attached to a respective inner ring segment 6. First ship laps 9 may take the form of metal plates and each extend over and beyond a respective inner ring segment gap in circumferential direction U of the gas turbine. Each first ship lap 9 extends over the full length of an associated inner ring segment gap 7 in an axial direction of the gas turbine; i.e., perpendicularly to the plane of the drawing of FIG. 1. A first flow space 12 is formed between each inner ring segment gap 7 and a respective first ship lap.

Outer ring segments 3 are curved in circumferential direction U of the gas turbine and form an annular outer shell, not entirely shown in FIG. 1. An outer ring segment gap 4 is located between each two adjacent outer ring segments 3. Each outer ring segment gap 4 may be equal to, smaller, or larger than inner ring segment gaps 7. Each outer ring segment 3 has a cooling air passage 13 formed therein in radial direction R of the gas turbine. However, alternatively, a plurality of cooling air passages 13 may be provided, forming a row in the axial direction of the gas turbine. The number and size of cooling air passages 13 are selected to be as small as possible, so that only a minimal portion of air is diverted from a compressor (not shown) of the gas turbine. Preferably, cooling air passages 13 are narrower than outer ring segment gaps 4 and inner ring segment gaps 7.

Disposed at cooling air passage or passages 13 are pseudo ship laps 14, which are internally attached to outer ring segments 3. Pseudo ship laps 14 may take the form of metal plates and each extend over and beyond a respective cooling air passage 13 in circumferential direction U of the gas turbine. Thus, a second flow space 15 is formed between each cooling air passage 13 and a respective pseudo ship lap 14. Disposed at outer ring segment gaps 4 are second ship laps 16, each of which are internally attached to a respective outer ring segment 3. Second ship laps 16 may take the form of metal plates and each extend over and beyond a respective outer ring segment gap 4 in circumferential direction U of the gas turbine. Each second ship lap 16 extends over the full length of an associated outer ring segment gap 4 in an axial direction of the gas turbine; i.e., perpendicularly to the plane of the drawing of FIG. 1. A third flow space 17 is formed between each outer ring segment gap 4 and a respective second ship lap 16.

Outer ring segments 3 are spaced apart from inner ring segments 6 in radial direction R of the gas turbine. Outer radius $r_1$ of inner ring segments 6 is smaller than inner radius $r_2$ of outer ring segments 3. Thus, an annular space is present between outer ring segments 3 and inner ring segments 6. In FIG. 1, this annular space is referred to as mixing space 8.

During operation, the hot gas from the turbine chamber of the gas turbine forms a plurality of first subflows h. Each of first subflows h of hot gas H flows through a respective one of inner ring segment gaps 7. Subflows h of hot gas H flow from the inside to the outside in radial direction R of the gas turbine, and may therefore also be referred to as inner subflows. Each first subflow h is deflected by an associated first ship lap 9 into mixing space 8. At the same time, cooling air K diverted from the compressor of the gas turbine forms a plurality of second subflows k. Subflows k of cooling air K flow from the outside to the inside in radial direction R of the gas turbine, and may therefore also be referred to as outer subflows. Second subflows k flow alternately through outer ring segment gaps 4 and cooling air passages 13 along circumferential direction U. Each second subflow k that flows through an outer ring segment gap 4 is deflected by an associated second ship lap 16 into mixing space 8. Each second subflow k that flows through a cooling air passage 13 is deflected by an associated pseudo ship lap 14 into mixing space 8.

First subflows h and second subflows k then flow into mixing space 8 in the same circumferential direction U of the gas turbine, and form a mixed flow M. Within mixed flow M, temperature equalization takes place between the original first subflows h and second subflows k. The mixed temperature is transferred to outer ring segments 3 and inner ring segments 6. This temperature transfer is even more important for inner ring segments 6 than for outer ring segments 3, because inner ring segments 6 are exposed to higher thermal loads due to the adjacent hot gas H. Thus, first subflows h of hot gas are used in a purposeful manner to equalize temperatures. Mixed flow M can exit mixing space 8 through gaps (not shown in FIG. 1) in axially downstream holders of inner ring segments 6.

The intermixing of first subflows h and second subflows k results in cooling of inner ring segments 6 and heating of outer ring segments 3. Thus, the temperatures of inner ring segments 6 and the temperatures of outer ring segments 3 are converged. In this process, thermal gradients and thermal stresses resulting therefrom are reduced or even prevented, in particular in inner ring segments 6. The risk of cracking is reduced. This increases the safety of the gas turbine during operation.

The present invention relates to a device 1 for influencing the temperatures in inner ring segments 6 of a gas turbine, the device including, in circumferential direction U of the gas turbine, at least one outer shell assembly 2 having a plurality of outer ring segments 3 and at least one inner shell assembly 5 having a plurality of inner ring segments 6, the plurality of inner ring segments 6 being equal to or greater in number than the plurality of outer ring segments 3, an outer ring segment gap 4 being present between each two adjacent outer ring segments 3, and an inner ring segment gap 7 being present between each two adjacent inner ring segments 6.

In order to provide a device which improves the temperature distribution in inner ring segments of a gas turbine, yet is simple in design, requires little manufacturing effort and has a low weight, an outer ring segment gap 4, or at least a radial cooling air passage 13, is located opposite each inner ring segment gap 7 in radial direction R of the gas turbine, each inner ring segment gap 7 having a first ship lap 9 associated therewith, each outer ring segment gap 4 having a second ship lap 16 associated therewith, and each cooling air passage 13 having a pseudo ship lap 14 associated therewith to deflect subflows k, h into the same circumferential direction U.

LIST OF REFERENCE NUMERALS 1 device
2 outer shell assembly
3 outer ring segment
4 outer ring segment gap
5 inner shell assembly
6 inner ring segment
7 inner ring segment gap
8 mixing space
9 first ship lap
12 first flow space
13 cooling air passage
14 pseudo ship lap
15 second flow space
16 second ship lap
17 third flow space
H hot gas
h first subflow K cooling air
k second subflow
M mixed flow
U circumferential direction
R radial direction
$r_1$ outer radius
$r_2$ inner radius
b width

What is claimed is:

1. A device for influencing the temperatures in inner ring segments of a gas turbine, comprising, in a circumferential direction of the gas turbine:
   at least one outer shell assembly having a plurality of outer ring segments;
   at least one inner shell assembly having a plurality of inner ring segments, the plurality of inner ring segments being equal to or greater in number than the plurality of outer ring segments;
   wherein an outer ring segment gap is provided between each two adjacent outer ring segments, and an inner ring segment gap is provided between each two adjacent inner ring segments; and
   wherein, located opposite each inner ring segment gap, in a radial direction of the gas turbine, is either one of the outer ring segment gaps or a radial cooling air passage and each inner ring segment gap has a first ship lap associated therewith, each outer ring segment gap had a second ship lap associated therewith, and each cooling air passage has a pseudo ship lap associated therewith, to deflect subflows into the same circumferential direction.

2. The device according to claim 1, wherein the first ship laps, the second ship laps, and the pseudo ship laps overlap their respectively associated inner ring segment gaps, outer ring segment gaps, and cooling air passages in the circumferential direction of the gas turbine.

3. The device according to claim 1, wherein the first ship laps, the second ship laps, and the pseudo ship laps are continuous metal plates without any discontinuities in the material.

4. The device according to claim 1, wherein the first ship laps end at the same positions as the second ship laps or the pseudo ship laps, or overlap the second ship laps or the pseudo ship laps in the circumferential direction of the gas turbine.

5. The device according to claim 2, wherein the first ship laps end at the same positions as the second ship laps or the pseudo ship laps, or overlap the second ship laps or the pseudo ship laps in the circumferential direction of the gas turbine.

6. The device according to claim 1, wherein a ratio of a number of inner ring segments to a number of outer ring segments is 2:1.

7. A stationary gas turbine, comprising a device according to claim 1.

8. An aircraft engine, comprising a device according to claim 1.

9. A method for influencing the temperatures in inner ring segments of a gas turbine using the device according to claim 1, comprising
   providing at least two first subflows of hot gas and at least two second subflows of cooling air into a mixing space between the outer ring segments and the inner ring segments in the same circumferential direction of the gas turbine,
   thermally mixing the first subflows of hot gas and the second subflows of cooling air in the mixing space, thereby producing a mixed flow.

10. The method as recited in claim 9, wherein the second subflows of cooling air enter the mixing space upstream of or at the same position as the first subflows of hot gas in the circumferential direction of the gas turbine.

11. The method as recited in claim 9, wherein the mixed flow passes through the mixing space in the circumferential direction of the gas turbine.

12. The method as recited in claim 9, wherein the mixed flow exits axially downstream of the inner ring segment.

13. A device for influencing the temperatures in inner ring segments of a gas turbine, comprising, in a circumferential direction of the gas turbine:
   at least one outer shell assembly having a plurality of outer ring segments;
   at least one inner shell assembly having a plurality of inner ring segments, the plurality of inner ring segments being equal to or greater in number than the plurality of outer ring segments;
   a mixing space between the outer ring segments and the inner ring segments in the same circumferential direction of the gas turbine providing mixing of at least two first subflows of hot gas and at least two second subflows of cooling air in the circumferential direction of the gas turbine
   wherein an outer ring segment gap is provided between each two adjacent outer ring segments, at least one of the second subflows flowing through the outer ring segment gap in an inward radial direction;
   and an inner ring segment gap is provided between each two adjacent inner ring segments, at least one of the first subflows flowing through the inner ring segment gap in an outward radial direction; and
   wherein, located opposite each inner ring segment gap, in a radial direction of the gas turbine, is either one of the outer ring segment gaps or a radial cooling air passage so that at every circumferential position where the hot gas through the inner ring segment gap can enter the mixing space, the cool gas can also enter the mixing space, wherein the at least one of the second subflows flowing through the outer ring segment gap in the inward radial direction and the at least one of the first subflows flowing through the inner ring segment gap in the outward radial direction also enter the mixing space is a same circumferential direction.

14. The device according to claim 13, wherein each inner ring segment gap has a first ship lap associated therewith, each outer ring segment gap has a second ship lap associated therewith, and each cooling air passage has a pseudo ship lap associated therewith, to deflect subflows into the same circumferential direction.

15. The device according to claim 14, wherein the first ship laps, the second ship laps, and the pseudo ship laps overlap their respectively associated inner ring segment gaps, outer ring segment gaps, and cooling air passages in the circumferential direction of the gas turbine.

16. The device according to claim 14, wherein the first ship laps, the second ship laps, and the pseudo ship laps are continuous metal plates without any discontinuities in the material.

17. The device according to claim 14, wherein the first ship laps end at the same positions as the second ship laps or the pseudo ship laps, or overlap the second ship laps or the pseudo ship laps in the circumferential direction of the gas turbine.

18. The device according to claim 15, wherein the first ship laps end at the same positions as the second ship laps or the pseudo ship laps, or overlap the second ship laps or the pseudo ship laps in the circumferential direction of the gas turbine.

19. The device according to claim 13, wherein a ratio of a number of inner ring segments to a number of outer ring segments is 2:1.

20. A stationary gas turbine, comprising a device according to claim 13.

21. An aircraft engine, comprising a device according to claim 13.

22. A method for influencing the temperatures in inner ring segments of a gas turbine using the device according to claim 13, comprising providing the at least two first subflows of hot gas and the at least two second subflows of cooling air into the mixing space between the outer ring segments and the inner ring segments in the same circumferential direction of the gas turbine, thermally mixing the first subflows of hot gas and the second subflows of cooling air in the mixing space, thereby producing a mixed flow; and flowing the at least one of the second subflows through the outer ring segment gap in the inward radial direction and the at least one of the first subflows flowing through the inner ring segment gap in the outward radial direction also enter the mixing space is the same circumferential direction.

\* \* \* \* \*